Dec. 8, 1970  E. F. GLASS  3,545,186
FLEXIBLE FLOOR EXTENSION FOR A HARVESTING MACHINE
Filed Oct. 14, 1968
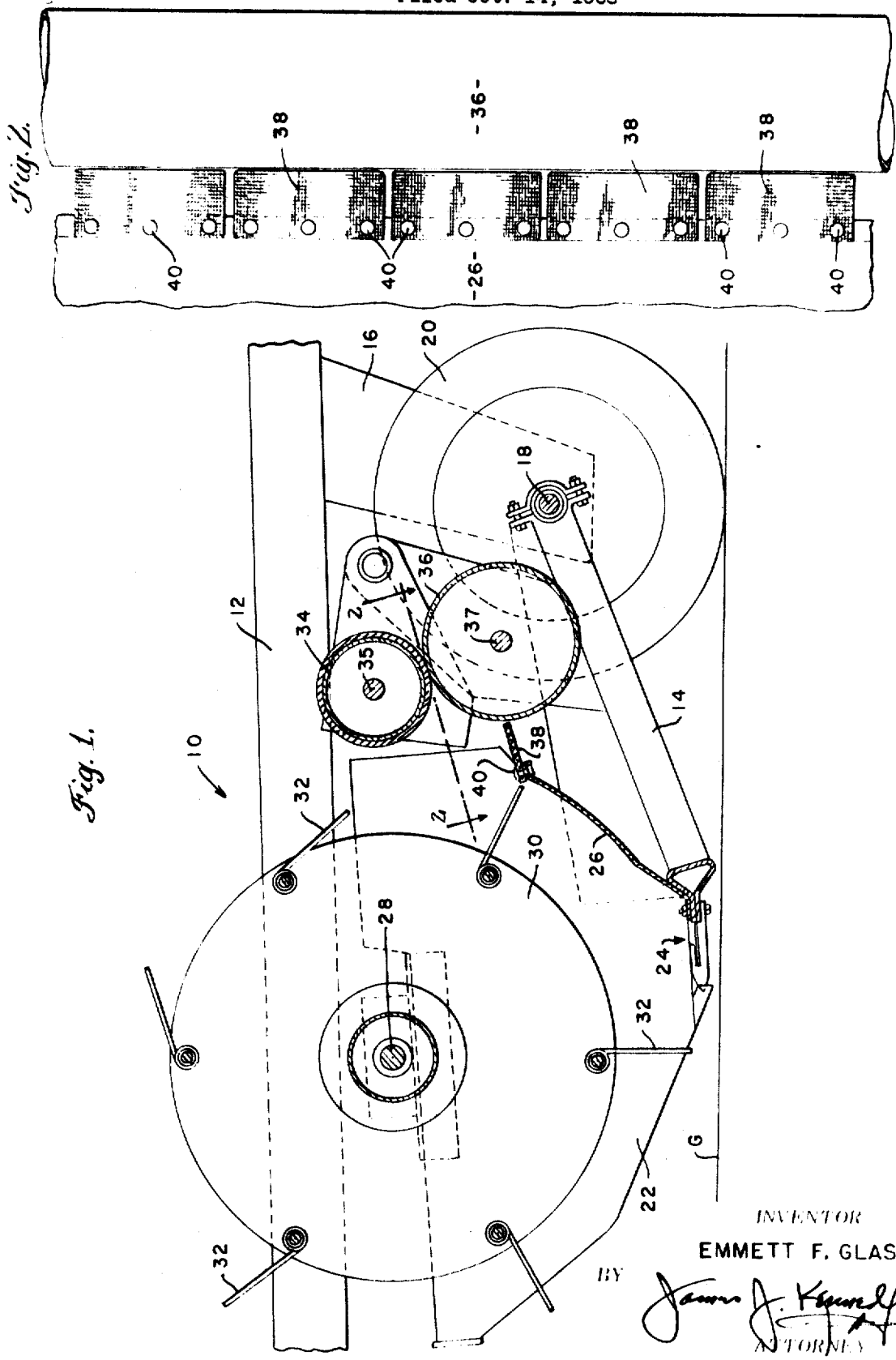
INVENTOR
EMMETT F. GLASS
BY
ATTORNEY

United States Patent Office 3,545,186
Patented Dec. 8, 1970

3,545,186
FLEXIBLE FLOOR EXTENSION FOR A
HARVESTING MACHINE
Emmett F. Glass, Akron, Pa., assignor to Sperry Rand
Corporation, New Holland, Pa., a corporation of Delaware
Filed Oct. 14, 1968, Ser. No. 767,235
Int. Cl. A01d 43/10
U.S. Cl. 56—23
2 Claims

ABSTRACT OF THE DISCLOSURE

A flexible floor extension for a harvesting machine having conditioning rolls therein, which extension will yield in response to heavy objects passing thereover to separate those objects from the crop material and drop them to the ground before they pass through the conditioning rolls, but will not yield in response to the passage of crop material thereover so that light crop material will not fall to the ground prior to passing through the conditioning rolls.

BACKGROUND OF THE INVENTION

Farm machinery, like all machinery, is designed so that it functions more efficiently under some operating conditions than others. While a designer would like to be able to develop a machine which would perform equally well under all conditions it is common knowledge that a machine will have an optimum operating range and that various adjustments will have to be made to the machine so that it can effectively operate outside of this range.

Harvesting machines are generally designed for a wide variety of operating conditions but since there are so many operating and crop conditions under which the machine could be used, it is difficult to anticipate or allow for all of these situations. Some machines work best in medium density crops, others work best in crops grown in hilly areas, and still others work better on flat lands, etc. The crop conditions and terrain can vary from field to field on any good size farm.

It has been found, as the mower-conditioner type harvesting machine gains in acceptance, that the machine design is such that in forming windrows in light crop materials, there can be an excessive amount of crop loss through a space between the end of the floor or guide plate and the conditioning rolls. It is essential to the operation of the machine that there be a space between the floor and the rolls large enough to permit the removal of foreign objects or materials such as rocks, dirt, or the like, from the crop material before these materials pass through the rolls and cause damage to the machine. The space must be small enough so that the crop materials will pass thereover into the rolls, but the foreign materials, because of their weight differential, will fall through the space. A space or gap which is wide enough for normal operating conditions may be too wide when the machine is used in light crop materials and, thus, a portion of the crop material also falls through the opening before reaching the conditioning rolls and the subsequently formed windrow. Generally this material can not be gathered up by a hay baler or a harvester pick-up and, therefore, it is left in the field. As anyone can readily understand, this type of operation can be extremely costly to the farmer, since to leave the material in the field could lead to feed shortages or shortage in amounts of saleable crops and to pick it up requires additional time and machinery.

SUMMARY OF THE INVENTION

Accordingly it is the primary object of this invention to effect a more efficiently operating machine and one which will operate under a variety of different crop conditions.

Another object of this invention is to provide a way of insuring that the maximum in crop material is passed through the machine and formed into a windrow, while at the same time permitting rocks or other foreign material to be separated out of the crop material before it passes through the conditioning rolls.

A further object of the invention is to provide a plurality of flexible floor extensions which partially bridge the gap between the floor or guide plate and the conditioning rolls and which are capable of supporting crop material, but flex under the weight of the heavier foreign materials permitting them to drop through the space between the upper edge of the floor and the rolls.

DESCRIPTION OF THE DRAWING

FIG. 1 is a partial side elevation of a mower-conditioning machine equipped with a flexible floor extension of the type to be hereinafter described in detail.

FIG. 2 is a section view taken along the line 2—2 of FIG. 1.

DESCRIPTION OF THE PREFERRED EMBODIMENT

Referring generally to the drawing, a mower-conditioner harvesting machine, generally designated as 10 and of the type shown and described in U.S. Pat. 3,375,643, McCarty et al., is comprised of a main frame member 12 and a subframe member 14, which is pivotally connected to the main frame by means of a vertical frame plate 16 and an axle 18. A wheel 20 is suitably mounted on the frame, by means not shown, to make the frame mobile.

A subframe side plate 22 is suitably fixed to the subframe member 14, by means not shown, and forms part of the machine header structure. There is a plate 22 provided on either side of the header, although only one is shown in the drawing. At the base of side plates 22, and extending therebetween, transverse to the direction of travel of the machine, is a sickle means 24, disposed in close proximity to the ground, and which is adapted to cut crop material directed thereto. The rear end of the sickle means 24, as shown in FIG. 1, is fixed to the subframe member 14 and is pivotal therewith about axle 18. A floor or guide plate 26 extends upwardly and rearwardly from the sickle means 24 and forms the rear portion of the header portion of the machine.

A horizontally extending shaft 28 is journalled at either end thereof in side frame members 22 above sickle means 24. A reel 30 is rotatably mounted on shaft 28 and is driven from a suitable power source (not shown). The reel 30 is provided with a plurality of tine members 32 which tend to comb and sweep crop material over the sickle means 24 and up the guide plate 26 as the machine moves forwardly over the ground.

Behind the sickle means 24 and the reel 30 there is mounted a pair of cooperating conditioning rolls 34 and 36. These rolls are mounted on longitudinal shafts 35 and 37, respectively. These shafts are suitably journalled in the mobile frame and are driven by a suitable power source, not shown. Crop material cut by said sickle means 24 is swept up plate 26 by the reel tines 32 into the bite of the rotating rolls so that the crop material is passed between the rolls, being conditioned as it passes through, and is subsequently formed into a windrow as it is deposited on the ground behind the machine by suitable means not shown.

The floor or guide plate 26 extends upwardly and rearwardly toward the conditioning rolls 34 and 36 and is provided with an upper edge which terminates forwardly of the rolls, in spaced relation therefrom, as shown in FIGS. 1 and 2. A plurality of individual flexible extensions 38 are fixed along the upper edge by connecting means 40. Each flexible extension 38 is of a material which is stiff enough to permit cut crop materials to pass thereover as they are directed to the condition rolls, but the material will flex or bend under the weight of a foreign object, such as a stone, or the like and permit the removal of the foreign material by gravity from the crop material before it is passed between the rolls 34 and 36. As can be seen in FIG. 2, the rearward edge of the floor extensions 38 terminate in close proximity to the periphery of roll 36 and substantially bridge the gap between the upper edge of guide plate 26 and the rolls.

Although not specifically shown, it will be understood by those skilled in the art, that the floor extension need not be comprised of individual sections, but instead, the extension may be comprised of one every flexible, continuous length piece of material, or a full length, spring loaded piece of sheet metal, or individually spring loaded, adjacent sheet metal sections.

While this invention has been described in connection with a particular embodiment thereof, it will be understood that it is capable of modification, and this application is intended to cover any variations, uses, or adaptations following, in general, the principles of the invention including such departures from the present disclosure as come within the known or customary practice in the art to which the invention pertains, and as fall within the scope of the invention or the limits of the appended claims.

Having thus described my invention, what I claim is:

1. A machine for harvesting crop material comprising a mobile frame having a sickle means, a reel, rotatable about the longitudinal axis thereof, and a pair of cooperative conditioner rolls mounted therein, transverse to the direction of travel of said frame, said sickle means being mounted forwardly of and below said rolls in close proximity to the ground, a guide plate extending upwardly and rearwardly from said sickle means toward said rolls and having an upper edge terminating in spaced relation forwardly of said rolls, and flexible means on said upper edge extending rearwardly across said space toward said rolls, said flexible means yielding in response to the weight of foreign objects passing thereover whereby crop material is passed to said rolls and foreign objects picked up with said crop material and transmitted up said guide plate to said rolls are removed from said crop material by falling through said space before being directed to said rolls.

2. A machine for harvesting crop material, as recited in claim 1, wherein said flexible means is comprised of a plurality of flexible segments fixed by one edge thereof to the upper edge of said guide plate and extend rearwardly therefrom toward said rolls terminating ahead of and in close proximity to said rolls.

References Cited

UNITED STATES PATENTS

| 285,422 | 9/1883 | Lockhart | 130—27.9 |
| 3,375,643 | 4/1968 | McCarty et al. | 56—1 |

ANTONIO F. GUIDA, Primary Examiner

U.S. Cl. X.R.

130—27